UNITED STATES PATENT OFFICE.

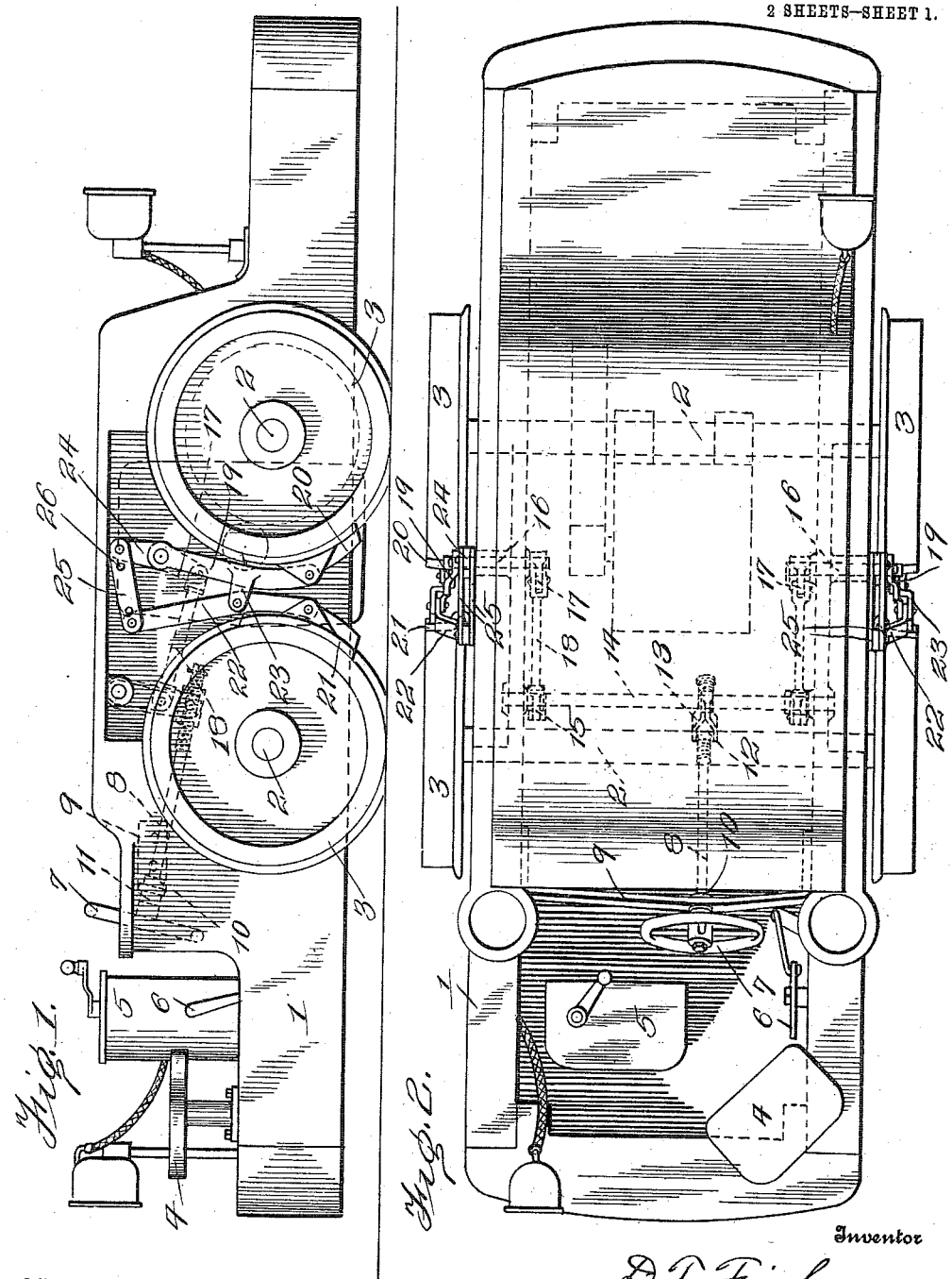

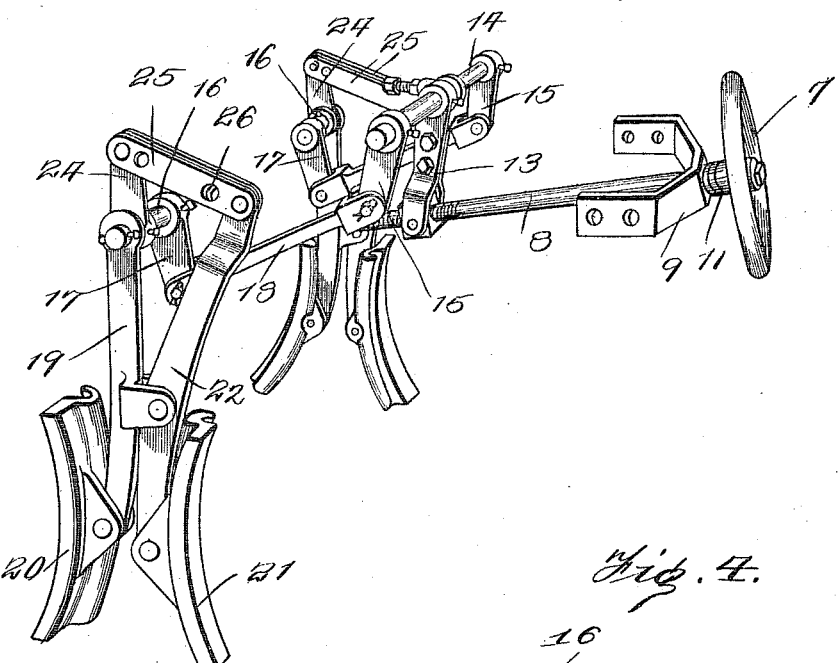

DUDLEY TYNG FISHER, OF COLUMBUS, OHIO, ASSIGNOR TO THE JEFFREY MANUFACTURING COMPANY, A CORPORATION OF OHIO.

BRAKE MECHANISM.

985,889.        Specification of Letters Patent.       Patented Mar. 7, 1911.

Application filed July 29, 1908. Serial No. 446,009.

*To all whom it may concern:*

Be it known that I, DUDLEY T. FISHER, a citizen of the United States, residing at Columbus, in the county of Franklin and State of Ohio, have invented certain new and useful Improvements in Brake Mechanism, of which the following is a specification, reference being had therein to the accompanying drawing.

This invention relates to wheel brakes and has for its object to provide a compact brake mechanism adapted for use between adjacent wheels of trucks having short wheel bases and capable at the same time of exerting a powerful braking action.

Another object is to provide a brake which will exert force principally along horizontal lines, and have no vertical component which when present has the harmful effect of drawing the truck frame down tight upon the axles.

Other objects will be apparent from a review of the specification and drawings.

In the drawings, Figure 1 shows a plan view of an electric mine locomotive equipped with a brake mechanism constructed in accordance with my invention. Fig. 2 is a side elevation of the same. Fig. 3 is a perspective view of the brake rigging shown detached from the locomotive. Figs. 4 to 7 show details.

1—1 indicate the frame parts of a locomotive which is supported upon the axles 2—2 and the wheels 3—3. At the rear end of the locomotive is placed the motorman's seat 4 and the controlling devices, such as the controller 5 for the electric traction motor, the sand box lever 6, brake wheel 7 etc. The screw shaft 8 is mounted in the yoke 9 secured to the side frames near the rear end of the locomotive, and it is prevented from longitudinal displacement with respect to the yoke by means of the shoulder 10 upon the shaft, and the collar 11 secured rigidly to the shaft by set screws.

The brake wheel 7 is rigidly mounted upon the rear end of the screw shaft, and the forward end of the shaft has threaded engagement with the nut 12, trunnioned in the lower forked end of the lever 13. This lever is rigidly secured at its upper end to the shaft 14, which is rotatably mounted at its ends on the side frames 1—1 of the locomotive. The levers 15—15 are rigidly carried by the shaft 14, one at either side of the locomotive and adjacent to the inner faces of the side frames 1—1. Journaled in the side frames are the short shafts 16—16, upon each of which is rigidly mounted an arm 17 and the latter is connected to the lever 15 by the connecting lever 18.

The brake shoe hanger 19 is pivoted to swing freely upon the outer end of shaft 16, and has the brake shoe 20 loosely mounted upon its lower end. The brake shoe 21 is mounted to swing freely upon the lower end of the brake shoe lever 22, which is in turn pivoted to the bracket arm 23, an integral part of the brake shoe hanger 19. The arm 24 mounted rigidly upon shaft 16 and the connecting link 25, constitute the means for communicating motion from the short shaft 16 to the brake lever 22. When the brake wheel 7 is turned in an anti-clockwise direction power is applied by means of the shafts, links and levers, above described, to force the brake shoes apart and against the wheel rims. It will be observed that by pivotally securing lever 22, carrying the brake shoe 21, to the hanger 19, which carries the brake shoe 20, space is economized longitudinally of the locomotive and a very compact brake mechanism made possible. Holes 26—26 in the two bars of the connecting link 25 permit the normal distance between the centers of suspension of the brake shoes to be adjusted to meet varying conditions.

What I claim is:

1. In a brake mechanism, the combination of a brake shoe, a lever to which it is secured and which is pivotally mounted upon the vehicle frame so as to freely swing therefrom in the arc of a circle, a second brake shoe, a second lever to which the second brake shoe is secured and which is pivotally mounted upon the first lever at a point distant from the pivotal connection between the first lever and the frame, and means for causing the levers to rotate with respect to each other about their pivotal connection with each other to vary the distance between the brake shoes.

2. In a car, the combination of a lever and a brake shoe attached thereto, said lever being mounted upon the car frame parts to swing freely, a second lever carried by the first lever and movable with respect thereto, a shoe carried by said second lever, and a common means for transmitting power to both brake shoes, through the medium of the said levers.

3. In a car, the combination with a truck having adjacent wheels upon one side, of a lever pivoted at its upper end to the car frame and carrying at its lower end a brake shoe, a second lever pivoted at a point between its ends to the first lever at a point midway of the ends of said first lever, a brake shoe mounted at the lower end of the lever, and means for drawing the upper end of the second lever toward the upper end of the first lever to force the brake shoes apart and against their respective wheel rims.

4. In a car, the combination with a shaft mounted in the car frame parts, of a brake lever freely pivoted upon the shaft at its upper end and carrying a brake shoe at its lower end, a second lever pivoted to the first at points between their ends, and also carrying a brake shoe at its lower end, and links connecting the upper end of the second lever with the said shaft, by which an angular movement of the shaft on its axis acts to move the brake shoes apart, and means for angularly moving the said shaft.

5. In a car, the combination with a double shoe brake rigging pivotally secured at one point only to the car frame and adapted to act upon each of two adjacent wheels, of means also pivotally secured to the car frame at the said point for applying power to the shoes to press them against the car wheels.

6. The combination in a car of a double shoe, double hanger, brake rigging secured to the car frame at one point only by means of a shaft on the frame, on which it is pivotally mounted, means for rotating the shaft, and means for communicating such motion to the brake shoes to force them against the car wheels.

In testimony whereof I affix my signature, in presence of two witnesses.

DUDLEY TYNG FISHER.

Witnesses:
JAS. G. CHANDLER,
P. W. MILLER.

---

Copies of this patent may be obtained for five cents each, by addressing the "Commissioner of Patents, Washington, D. C."